United States Patent [19]

Krokos et al.

[11] 4,182,062

[45] Jan. 8, 1980

[54] LICENSE PLATE LOCK BOX ASSEMBLY

[75] Inventors: Tom Krokos, Windsor; Richard C. Hofrichter, London, both of Canada

[73] Assignee: Ticketcheck International Limited, London, Canada

[21] Appl. No.: 828,858

[22] Filed: Aug. 29, 1977

[51] Int. Cl.² .............................................. G09F 7/00
[52] U.S. Cl. ........................................ 40/209; 40/2.2
[58] Field of Search ................. 40/10, 10 A, 201, 202, 40/209, 2.2; 224/29 B, 29 R

[56] References Cited

U.S. PATENT DOCUMENTS

| | | | |
|---|---|---|---|
| 1,113,860 | 10/1914 | Ames | 40/10 R X |
| 2,710,475 | 6/1955 | Salzman | 40/202 |
| 2,797,513 | 7/1957 | Edwards | 40/10 R X |
| 3,187,452 | 6/1965 | Dotson | 40/202 |
| 3,432,954 | 3/1969 | Ford | 40/202 |
| 4,059,912 | 11/1977 | Noah | 40/2 R |
| 4,069,606 | 1/1978 | Shevin et al. | 40/10 A |

*Primary Examiner*—Louis G. Mancene
*Assistant Examiner*—Wenceslao J. Contreras
*Attorney, Agent, or Firm*—George H. Riches and Associates

[57] ABSTRACT

A license plate lock box assembly which is adapted to be secured about, preferably, the rear license plate of a motor vehicle. The assembly comprises a holding means adapted to be secured to the motor vehicle, a transparent cover plate adapted to cover and enclose the license plate, and a locking means adapted to releasably lock the cover plate to the holding means. The cover plate includes a horizontal slot through which notices of traffic violations may be inserted and retained in the assembly.

4 Claims, 5 Drawing Figures

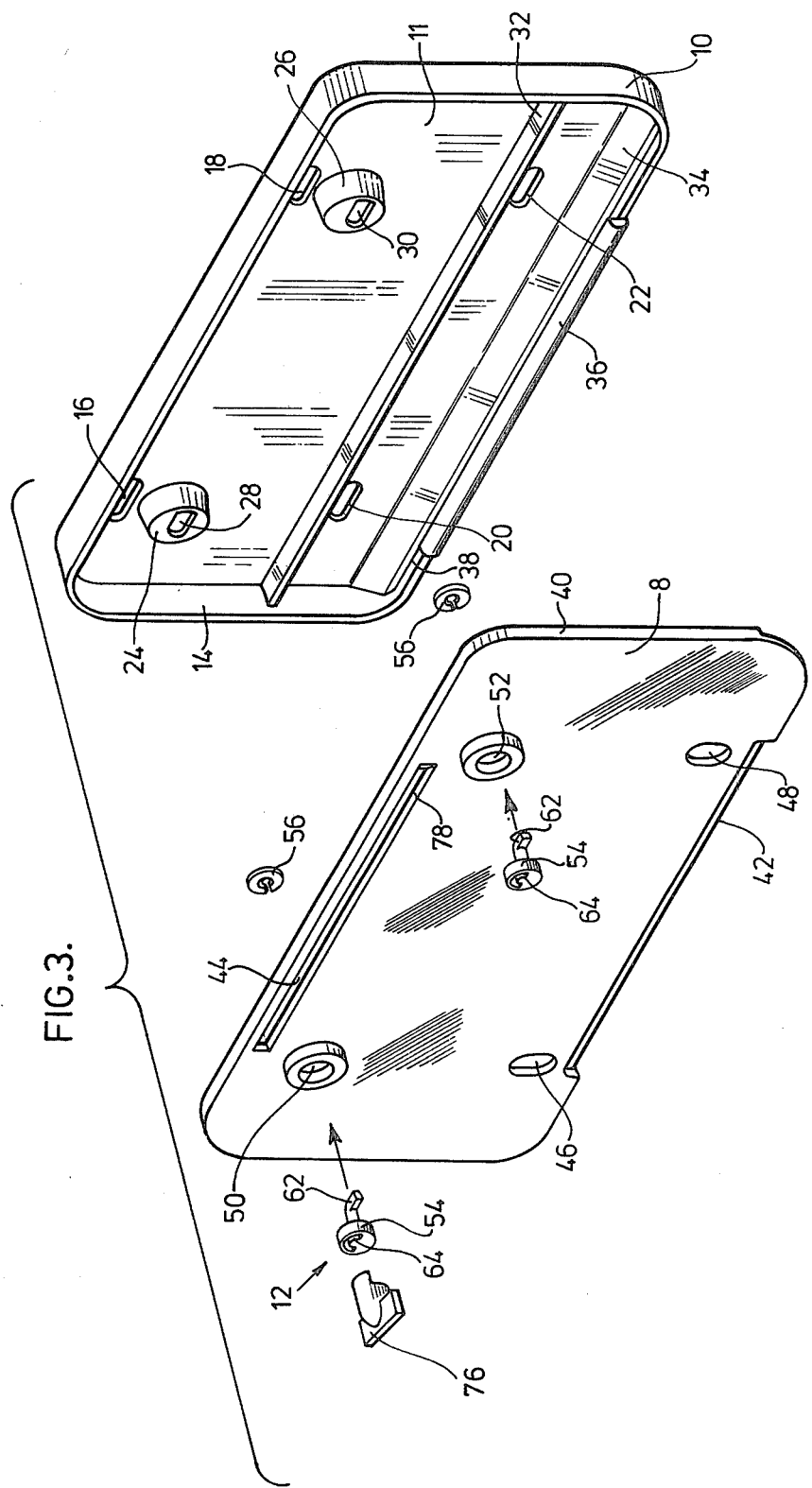

LICENSE PLATE LOCK BOX ASSEMBLY

BACKGROUND OF THE INVENTION

1. Field of the Invention

This invention relates generally to a license plate lock box assembly for a motor vehicle and more particularly, to a locking box adapted to be mounted on the license plate of a motor vehicle and adapted to receive and retain notices, such as parking violation notices. A special key or unlocking device is required to gain access to the box. An identifying indicia may also be used to indicate to the law enforcement officer or traffic warden issuing the notice that the vehicle is equipped with the license plate lock box assembly.

2. Description of the Prior Art

A dramatic increase in the number of motor vehicles being operated has created a rather unique problem. As the number of motor vehicles increase, more and more traffic violations are also being committed by the operators of these vehicles. These violations or offenses against the Highway Traffic Acts in the respective jurisdictions, both local and nationwide, include both moving and stationary violations.

When a police officer or other law enforcement officer apprehends a person whom he believes has committed a violation of the traffic laws of the jurisdiction, he can easily draft and serve upon that person, the necessary summons or notice of violation. The person's name and address are easily attainable and thus, a record of the person committing the offense may be retained.

However, when the offense is a stationary violation such as a parking offense, the law enforcement officer or traffic warden, as the case may be, completes the necessary notice of violation and usually places the notice or parking ticket on the windshield of the vehicle, under the wiper blades, if possible, to prevent the ticket from blowing away from the vehicle.

The owner or the operator of the vehicle, upon his return to the vehicle, removes the notice from the windshield of the vehicle and subsequently attends to its payment in due course.

As the law enforcement officer does not know nor can he ascertain at the time of the violation, whether the operator of the vehicle at the time of the violation is the owner thereof, he completes the notice of violation by identifying the vehicle by its license plate number. This number identifies the vehicle with its registered owner who may or may not be the operator of the vehicle at the time of the violation. The law enforcement officer has no regard for who is the operator of the vehicle at the time of the violation. The parking violation is issued therefore to the owner of the vehicle and not necessarily to the person committing the offense. If the notice of violation is not settled shortly, a summons is issued after a predetermined time period subsequent to the commission of the offense but this summons issues in the name of the registered owner of the vehicle.

This problem has become particularly relevant and of great importance to the vehicle rental industry. If a vehicle is rented for a short period of time, for example, three or four days, and the operator of the vehicle commits a parking violation, he receives a notice of this violation as explained hereinbefore. However, if the operator disregards this notice or deliberately destroys the notice, and subsequently returns the vehicle to the rental company, the notice of violation or parking ticket remains unpaid.

The rental company has no method of ascertaining whether any outstanding violations have been issued during the rental period at the time the vehicle is returned. A summons subsequently issues from the appropriate authority after an interval of time but that summons is issued to the owner of the vehicle, namely, the vehicle rental agency. The company or agency is therefore liable for payment of the fine or penalty which in many cases, is more than the fine or penalty of the original parking violation. The company or agency must then look to the customer who rented the vehicle at the time of the violation for payment thereof.

Unfortunately, the vehicle rental company or agency has great difficulty in attempting to contact the person or persons renting the vehicle at the time of the violation for repayment of the fine or ticket of the traffic violation. The person who committed the offense is usually very difficult to locate and contact and usually, if located, will ignore the request for payment from the rental company or deny the commission of the offense.

If the rental company wishes to pursue the offender or if it wishes to sue the offender for the amount of money of the ticket, large administration and legal costs may be incurred which do not justify the action. Also, considerable bad publicity for the agency may be created. Thus, rental companies tend to write off the cost of these tickets which represents a considerable loss each year.

In addition to the deliberate ignoring of the violation notice or the deliberate destruction thereof, it is also possible that the notice of violation was removed from the vehicle prior to the operator returning thereto by a third party or by inclimate weather. In these cases, the operator, who may be willing to pay for any fines for violations incurred during the rental period, is totally unaware of the notice of violation and the offense committed.

The rental company does not become aware of the violation until it receives a summons at a subsequent date which may be too late to pursue the customer for payment. Again, the rental agency will incur a loss for these tickets.

SUMMARY OF THE INVENTION

Accordingly, it is an object of the present invention to at least partially overcome these difficulties and problems by providing a locking box assembly adapted to be secured about a license plate (preferably the rear license plate) of a vehicle and adapted to receive and store printed material. Thus, when a law enforcement officer or traffic warden issues a notice of violation to a rental vehicle which has been identified as such, he places the notice of violation in the box about the rear license plate of the vehicle. When the vehicle is returned to the rental agency or company, the attendant, with the correct key, opens the box and can charge the customer with the amount of the violations at the time of paying the rental charge for the vehicle.

To this end, in one of its aspects, the invention provides a locking box assembly adapted to enclose a license plate of a motor vehicle and to be secured to said motor vehicle, said assembly comprising:

(i) a holding means adapted to be secured to said motor vehicle;

(ii) a transparent cover plate adapted to cover and enclose said license plate;

(iii) a locking means adapted to releasably lock said cover plate to said holding means.

In another of its aspects, the invention further provides a locking box assembly adapted to enclose a license plate of a motor vehicle and to be secured to said motor vehicle, said assembly comprising:

(i) a holding means adapted to be secured to said motor vehicle, said holding means provided with a horizontal shelf on the inner surface thereof, said shelf having a marginally downwardly depending top surface adapted to drain any moisture entering the assembly to the bottom thereof;

(ii) a transparent cover plate adapted to cover and enclose said license plate, said cover plate having a horizontal slot provided in the upper portion thereof and adapted to receive a piece of paper or similar material and allow said paper to fall into said assembly behind said cover plate and license plate onto said ledge of said holding means;

(iii) a locking means adapted to releasably secure said cover plate to said holding means, said locking means comprising a locking device adapted to be inserted through said cover plate and to releasably secure said cover plate to said holding means, a retainer ring adapted to be inserted on said locking device between said cover plate and said holding means, and a releasing key adapted to co-operate with said locking device and adapted to release said locking device.

In a further aspect of the invention, there is provided a system for identifying a rental vehicle and for retaining parking tickets or traffic violation notices issued to said rental vehicle, said system comprising an identifying indicia placed in a prominent position on said vehicle and a locking box assembly adapted to enclose a rear license plate of a motor vehicle and to be secured to said motor vehicle, said assembly comprising:

(i) a holding means adapted to be secured to said motor vehicle, said holding means provided with a horizontal shelf on the inner surface thereof, said shelf having a marginally downwardly depending top surface adapted to drain any moisture entering the assembly to the bottom thereof;

(ii) a transparent cover plate adapted to cover and enclose said license plate, said cover plate having a horizontal slot provided in the upper portion thereof and adapted to receive a piece of paper or similar material and allow said paper to fall into said assembly behind said cover plate and license plate onto said ledge of said holding means;

(iii) a locking means adapted to releasably secure said cover plate to said holding means, said locking means comprising a locking device adapted to be inserted through said cover plate and to releasably secure said cover plate to said holding means, a retainer ring adapted to be inserted on said locking device between said cover plate and said holding means, and a releasing key adapted to co-operate with said locking device and adapted to release said locking device; into which said parking tickets or traffic violation notices are inserted and retained.

BRIEF DESCRIPTION OF THE DRAWINGS

Further objects and advantages of the invention will appear from the following description taken together with the accompanying drawings in which:

FIG. 3 is an exploded view of the box of the present invention.

DESCRIPTION OF THE PREFERRED EMBODIMENT

Figure 1:
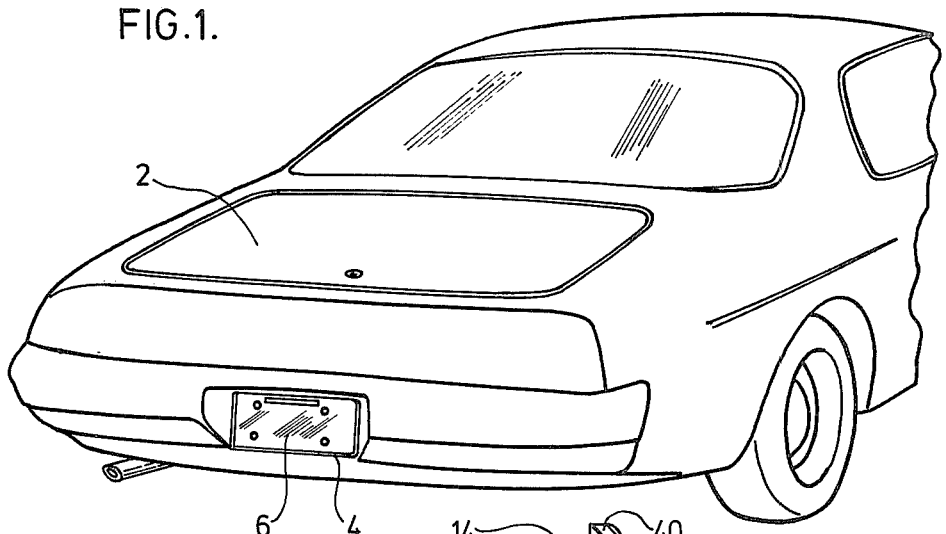
FIG. 1 is a perspective view of the rear of a car showing the placement of the box assembly according to the present invention about the rear license plate of the car.

Reference is first made to FIG. 1 which shows the rear portion of a motorized vehicle 2 with the box assembly 4 of the present invention secured about the rear license plate 6 of the car. While the present disclosure will refer to the device mounted on the rear license plate of a car, it is to be understood that the device is suitable for use with any type of vehicle which has a license plate attached thereto. Also, the device may be secured to the license plate wherever located on the vehicle. It is also understood that the shape of the box assembly may be adapted to correspond to a license plate of any particular size but for the ease of explanation and reference, the dislosure will refer to a license plate of generally rectangular shape which is found in most North American jurisdictions.

Referring now to FIG. 3, there is shown an exploded view of the device of the present invention. The device comprises three basic parts; a cover plate 8, a holding means 10 and a locking means 12.

The holding means 10 comprises a vertical back plate 11 with a circumferential lip 14 therearound. The size of the holding means is such that the license plate of the vehicle fits within the lip 14. Upper holes 16, 18 and lower holes 20, 22 are provided through which the license plate lock box is secured to the rear of the vehicle (as explained hereinafter). Bosses 24, 26 are provided with holes 28, 30 therein which serve to hold the locking means 12 in place (as explained hereinafter).

A horizontal shelf 32 is provided on the rear vertical wall of the back plate 11, this shelf having a marginally downward slope to the top surface. The lower rear surface 34 of the back plate is also slanted downward to the front edge of the lip 14. A small lip 36 is provided across the front portion of the front edge of the lip 14 thus creating a small slot 38 on the forward inner and central portion of the front edge of the lip.

The cover plate 8 is a transparent rectangular plate of the same size as the holding means 10 but with a small lip 40 about the sides and upper surface. A recessed portion 42 is cut into the lower front part of the plate and the length and height of this recessed portion corresponds to the length and height of the small lip 36.

A horizontal slot 44 is cut into the central part of the top portion of the cover plate and the length of the slot extends across a substantial portion of the face. The width and length of this slot is made to accommodate the notice of parking violation in most jurisdictions.

Holes 46, 48 are provided on the lower part of the vertical surface of the cover plate 8 and are used to secure the license plate to the cover plate. Holes 50, 52 are provided on the upper portion of the cover plate 8 which correspond to bosses 24, 26 through which the locking means 12 is inserted to secure the assembly together.

Locking means 12 may consist of any means adapted to releasably secure the cover plate 8 to the holding means 10. The locking means should be designed to prevent the operator of the vehicle from tampering therewith yet should be easily releasable by an authorized person with the correct tools.

Figure 2:
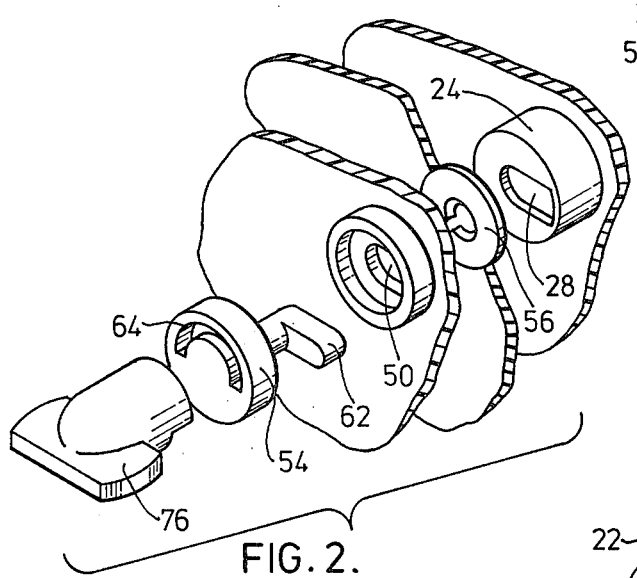
FIG. 2 is an exploded view of a locking means suitable for use with the box of the present invention.
Figure 5:
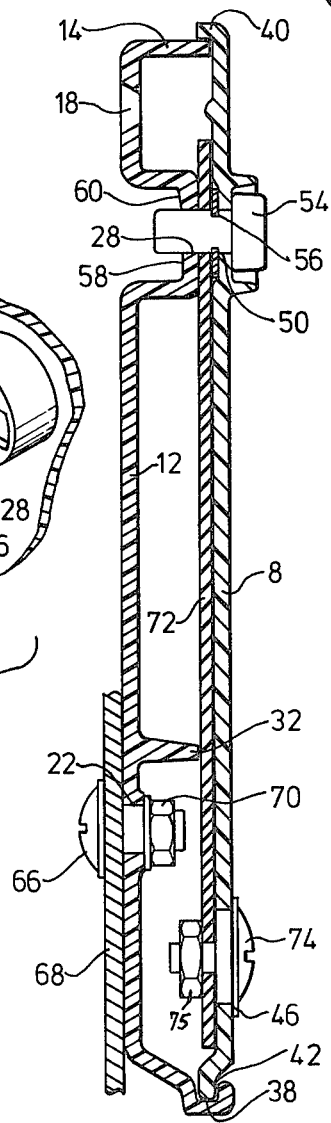
FIG. 5 is an end view of FIG. 4 with the locking means in place. (This Figure is located on the sheet containing FIGS. 1 and 2).

A suitable device for such a locking means may be simply designed and, with reference to FIGS. 2 and 3, may consist of a locking device 54, a retainer ring 56 in conjunction with holes 50, 52 and holes 28, 30 in bosses 24, 26 respectively. The rear surface 58 of the bosses 24, 26 are depressed inward (see FIG. 5) and have a cam-lock surface 60 on one side. When the locking means is assembled as shown in FIG. 5, the locking device 54 is inserted through hole 50, through retainer ring 56, through hole 28 and twisted so that the tab portion 62 on the locking device 54 engages the rear surface 58 of the boss 24. In order to disengage the device, a special releasing key 76 is required which engages in slot 64 in the head of the locking device 54 which when turned, releases the locking means and the device may be disassembled.

The device may be easily and quickly assembled and secured to the vehicle. As shown in FIG. 5, the first step is to secure the back plate 11 to the vehicle. This may be done by using holes 16, 18 and/or holes 20, 22. In order to accommodate various designs and sizes of cars, four holes 16, 18, 20 and 22 are provided on the back plate for securing this plate to the vehicle. This may be accomplished by any means well known in the art including self-tapping screws, nuts and bolts, and others. An example is shown in FIG. 5 wherein a screw 66 is used and inserted from the rear through the vehicle 68, hole 22 and is secured by nut 70. While no securing means is shown through hole 18 in FIG. 5, it is to be understood that any or all of the holes 16, 18, 20 and 22 may be used for this purpose.

Figure 4:
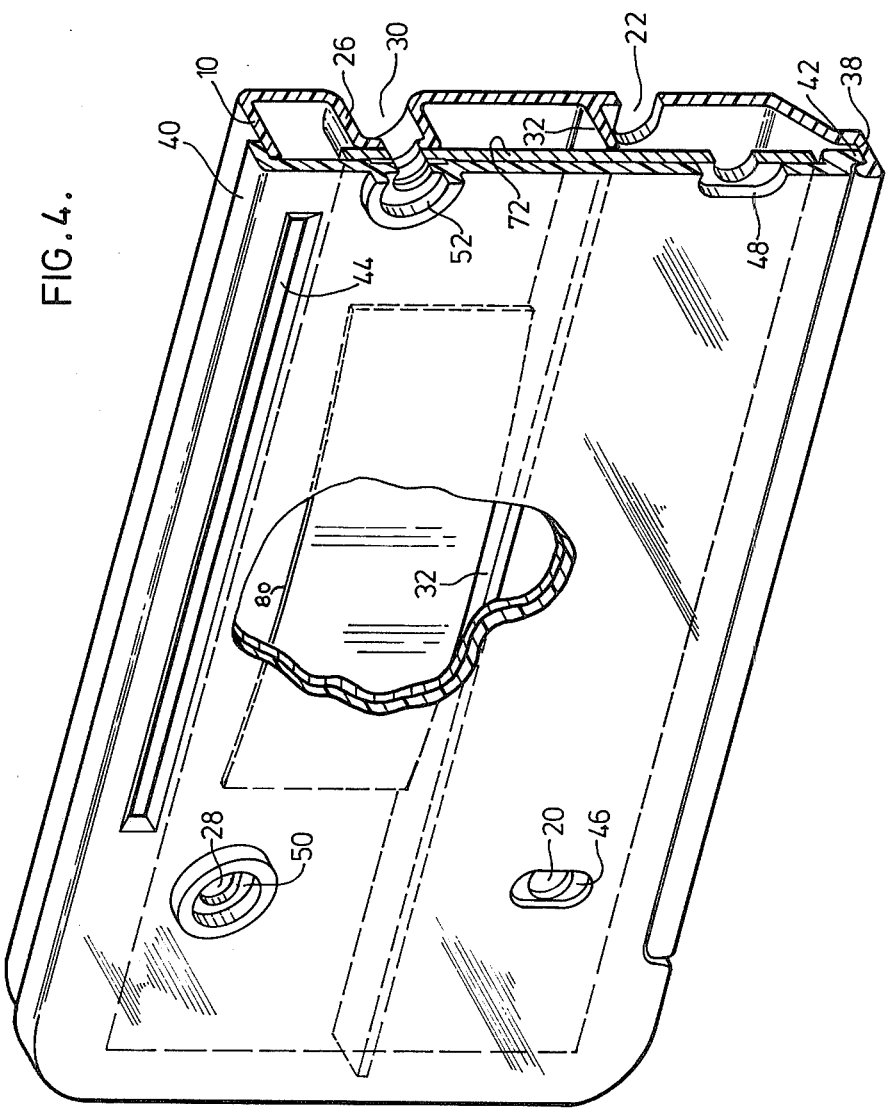
FIG. 4 is a partially cut-away view of the box of the present invention through the locking means thereof.

The license plate 72 is then secured to the cover plate 8. As shown in FIG. 5, the license plate is placed on the rear surface of the cover plate 8 and may be secured thereto by any means well known in the art. An example as shown in FIG. 5 comprises a screw 74 extending through hole 46, through the license plate 72 and held by nut 75. Self-tapping screws may also be used or any other means known in the art. As shown in FIG. 4, the license plate 72 fills most of the visible surface of the cover plate 8 but is below the slot 44 to enable the tickets, when placed through the slot 44, to fall to the shelf 32.

The cover plate 8 and attached license plate 72 are then secured to the holding means 10. Recessed portion 42 is inserted into the slot 38 (see FIG. 5) and the cover plate 8 is then aligned with the holding means 10. Once assembled, the cover plate 8 cannot move downward due to the interaction of recessed portion 42 with the slot 38 and also due to the interaction of lip 40 on the upper surface of lip 14 of the back plate 11. Sideways movement is also prevented due to lip 40.

The locking means 12 is then affixed into place which releasably secures the cover plate 8 to the holding means 10. Once assembled, holes 52 and 30 are aligned as shown in FIG. 4 to enable the locking means 12 to be inserted and secured.

To unlock the device, releasing key 76 is provided which corresponds to the slot 64 in locking device 54 which when inserted and turned, releases tab portion 62 from the rear surface 58 of the boss 24.

The device of the present invention has been designed to overcome the problem of entry of water, snow or ice through the ticket insertion slot 44. The top surface of the ticket retention shelf 32 has a marginally downward slope thus allowing any moisture which might enter into the box to drain downward to the bottom. As the recessed portion 42 and the slot 38 do not provide an airtight seal, moisture will escape if a build-up occurs within the device itself. Also, a small ridge 78 is provided on the ticket insertion slot which aids in preventing the entry of moisture into the device.

The locking means 12 is easily secured and released when the releasing key 76 is used. However, it is difficult to open the box without the proper tools thus preventing any tampering with the device. The cam-lock surface 60 is designed in order that considerable torque is required on the locking device 54 to release the assembly. Without the special key 76, it is virtually impossible to open the assembly. For instance, the device cannot be opened with a screwdriver.

The box is preferably manufactured from polycarbonates. The cover plate 8 must be clear or sufficiently transparent to allow the license plate to be visible therethrough; the holding means may be opaque. Also, polycarbonates have sufficient strength to withstand abuse and are relatively impervious to impact and to gasoline or other solvents.

The operation of the device will now be explained with particular reference to the advantages of the use of the device. When a car or other vehicle is rented from a rental company or agency, the device is assembled about the rear license plate of the vehicle.

If the operator of the vehicle commits a parking violation or other similar offense, the police officer or traffic warden, after issuing the appropriate notice, will place this notice 80 through the ticket insertion slot 44 of the cover plate 8 of the box.

The ticket 80 will then drop down and be held on the shelf 32 behind the license plate 72 of the vehicle. When the vehicle is returned to the rental company, the officer of the rental company will, using the releasing key 76, open the box and remove any parking tickets or other violation notices from the shelf. The amount of these tickets will then be added to the customer's account thereby ensuring that the person committing the violation pays for the ticket.

The ticket 80, when held on the shelf 32, will not drop down to the bottom of the holding means 10 because the leading edge of the shelf 32 is abutting the rear of the license plate 72 as shown in FIG. 5.

The use of these devices represents a tremendous savings to vehicle rental agencies. It is also an advantage to the law enforcement departments as the number of summons to be issued will be reduced accordingly. Payment will be forthcoming immediately for the violations from the rental companies which represents a saving in manpower and expense to the local law enforcement agencies.

In a preferred embodiment of the invention, a sign or identifying indicia may be placed on the inside windshield of the vehicle identifying the vehicle as a rental vehicle which has been equipped with a device of the present invention. Thus, the police officer or traffic warden, when he sees the identifying sign, knows immediately to place the notice of violation in the box which is mounted on the rear of the vehicle.

Although the disclosure describes and illustrates a preferred embodiment of the invention, it is to be understood that the invention is not restricted to this particular embodiment.

What we claim is:

1. A locking box assembly to enclose a license plate of a motor vehicle and to be secured to said motor vehicle, said assembly comprising:
   (i) a holding means to be secured to said motor vehicle;
   (ii) a transparent cover plate to cover and enclose said license plate with a horizontal slot in the upper portion of the cover plate;
   (iii) a locking means to releasably lock said cover plate to said holding means;
   wherein a horizontal shelf is provided on the inner surface of the holding means, said shelf for retention of paper or like material inserted through the slot in the cover plate, said shelf having a marginally downwardly depending top surface whereby any moisture entering said assembly will drain off said shelf to the bottom of said assembly.

2. A locking box assembly to enclose a rear license plate of a motor vehicle and to be secured to said motor vehicle, said assembly comprising:
   (i) a holding means to be secured to said motor vehicle, said holding means provided with a horizontal shelf on the inner surface thereof, said shelf having a marginally downwardly depending top surface to drain any moisture entering the assembly to the bottom thereof;
   (ii) a transparent cover plate to cover and enclose said license plate, said cover plate having a horizintal slot provided in the upper portion thereof to receive a piece of paper or similar material and allow said paper to fall into said assembly behind said cover plate and license plate onto said ledge of said holding means;
   (iii) a locking means to releasably secure said cover plate to said holding means, said locking means comprising a locking device to be inserted through said cover plate and to releasably secure said cover plate to said holding means, a retainer ring to be inserted on said locking device between said cover plate and said holding means, and a releasing key to co-operate with said locking device to release said locking device.

3. A system for identifying a rental vehicle and for retaining parking tickets or traffic violation notices issued to said rental vehicle, said system comprising an identifying indicia placed in a prominent position on said vehicle and a locking box assembly as claimed in claim 2 into which said parking tickets or traffic violation notices are inserted and retained.

4. A system as claimed in claim 3 when said identifying indicia is a decal placed in the windshield of said vehicle.

* * * * *